Aug. 8, 1944.   J. VAN VULPEN ET AL   2,355,488
BATTERY CHARGING SYSTEM
Filed Jan. 7, 1943
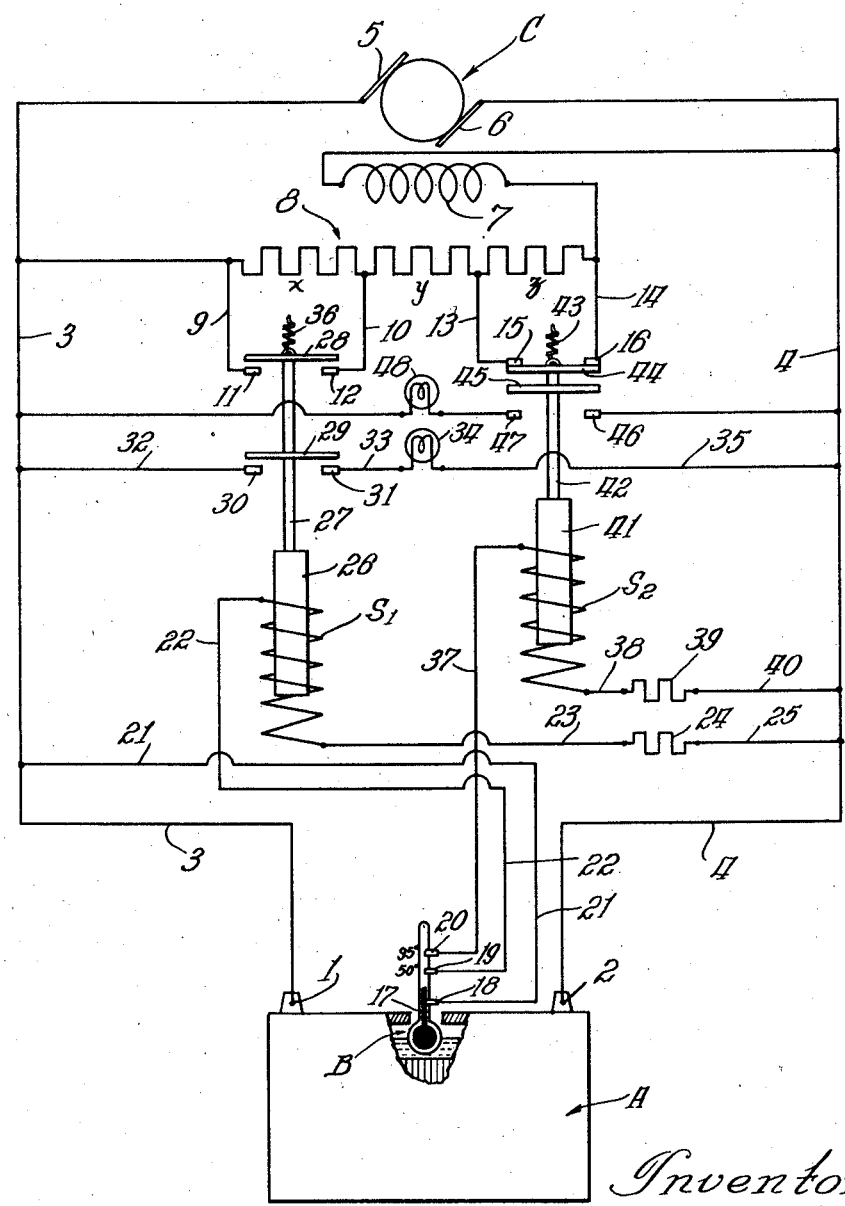
Inventors:
John Van Vulpen and
Everett H. Burgess
By Barnett Truman
Attys.

Patented Aug. 8, 1944

2,355,488

UNITED STATES PATENT OFFICE 2,355,488

BATTERY CHARGING SYSTEM

John Van Vulpen and Everett H. Burgess, Chicago, Ill., assignors to Vapor Car Heating Company, Inc., Chicago, Ill., a corporation of New York Application January 7, 1943, Serial No. 471,530

3 Claims. (Cl. 320—35)

This invention relates to a new and improved battery charging system, more particularly to such a system wherein the generator or other source of charging current is so controlled as to vary the rate at which current is supplied to the battery in accordance with changes in the internal temperature within the battery that is being charged.

Briefly described, an immersion type thermostat is positioned within the battery and acts through suitable relays to vary the output from the generator (and consequently the input to the battery) in accordance with changes in the prevailing temperature within the battery. If the temperature within the battery is below a predetermined minimum—for example 50° F.—the charging rate is reduced to a minimum, whereas this charging rate is again reduced to this minimum above a predetermined maximum battery temperature (for example 95°). At any battery temperature between the predetermined minimum and maximum, the charging rate is increased to the efficient maximum.

The single view shown in the drawing is a partial elevation and partial wiring diagram showing the control mechanism and thermostat, together with the generator, in combination with a battery that is being charged.

The battery A is shown with its terminals 1 and 2 connected, respectively, with the leads 3 and 4 extending from the output terminals 5 and 6 of the generator C. The field 7 of generator C is connected, in series with a control resistance 8, across the mains 3 and 4. The resistance 8 is divided into three sections, in series with one another, indicated at $x$, $y$ and $z$, respectively. The extremities of the first resistance section $x$ are connected by the wires 9 and 10 with a pair of fixed terminals 11 and 12. Similarly, the third section $z$ is connected at its respective ends by wires 13 and 14 with the fixed terminals 15 and 16.

The mercury tube thermostat B when inserted in operative position within a battery A, as shown in the drawing, will have its bulb immersed in the battery so as to respond to the internal temperature thereof and the mercury column 17 will rise in the stem so as to successively engage the three fixed contacts 18, 19 and 20 fixed at different elevations in the stem. The lower contact 18 is so positioned as to engage the mercury column 17 at any normal temperature, and this contact is connected with the generator main 3 through wire 21. The second contact 19 is engaged by the mercury column at a predetermined minimum battery temperature (for example 50°), this contact 19 being connected through wire 22 with one end of the solenoid coil $S_1$, the other end of this solenoid coil being connected through wire 23, resistance 24 and wire 25 with the other generator lead 4. In short, if the temperature within the battery A is at or above 50° F. the solenoid $S_1$ will be energized through these thermostat contacts, and pull down the core 26 and stem 27 so as to lower the bridging contact 28 into engagement with the fixed contacts 11 and 12 so as to complete a short circuit through wires 9 and 10 around the resistance $x$. At the same time, when solenoid $S_1$ is energized, the second bridging contact 29 on the stem 27 will be lowered into engagement with a second pair of fixed contacts 30 and 31 so as to complete a circuit from main lead 3 through wire 32, contacts 30, 29 and 31, wire 33, signal light 34 and wire 35 to the main 4, the light 34 giving a visible indication that the temperature within the battery A is above the predetermined minimum.

Whenever the solenoid $S_1$ is de-energized (for example when the battery temperature falls below the predetermined minimum of 50°) the core 26 and stem 27 will be elevated by the spring 36 so as to break the contacts 11, 28 and 12 which short-circuit the field resistance $x$ and to also break the contacts 30, 29 and 31 so as to de-energize the signal lamp 34.

Whenever the temperature within the battery A reaches a predetermined maximum so that mercury column 17 will engage the upper thermostat contact 20, another circuit will flow from main 3 through wire 21 and the thermostat through contact 20 and wire 37 to and through the solenoid coil $S_2$ and thence through wire 38, resistance 39 and wire 40 to the main 4. When the battery temperature is below the maximum of 95° and the solenoid $S_2$ is de-energized, the core 41 and stem 42 will be lifted by the spring 43 so as to bring the movable contact plate 44 into engagement with the pair of fixed contacts 15 and 16 and thus complete a short circuit through the wires 13 and 14 around the resistance section $z$. In other words, as long as the battery temperature is below 95°, the resistance $z$ will be short-circuited, but as long as the battery temperature is above this maximum and solenoid $S_2$ is energized the bridging contact 44 will be drawn down so as to break the short-circuit and the resistance section $z$ will remain in series with the field coil 7. When the battery circuit is above the maximum of 95° and solenoid $S_2$ is energized, the bridging contact 45 will be pulled down so as to engage another pair of fixed contacts 46 and 47 and thus complete another signal circuit through the lamp 48.

Assuming now that the generator C is suitably driven and that the battery A to be charged is connected with the generator output lines 3 and 4 and the thermostat B mounted in the battery so as to respond to the prevailing battery temperature, the other parts will then assume the several relative positions indicated in the drawing. Since the battery temperature is now below 50°, both solenoids $S_1$ and $S_2$ will be de-energized and the resistance section $z$ will now be short-circuited, leaving the resistance portions $x$ and $y$ of the total field resistance 8 in series with the field 7 so that a comparatively weak charging current will flow through the battery. In the event that the temperature within the battery rises above 50° F. both contacts 18 and 19 of the thermostat will be engaged by the mercury column 17 and a circuit will flow through solenoid $S_1$ so that a short-circuit will be completed around the resistance portion $x$. Since the resistance portion $z$ remains short-circuited, only the portion $y$ of resistance 8 remains in circuit with the field 7 and consequently a comparatively strong charging current flows through the outlet mains 3 and 4 into and through the battery A. This strong current will continue until the battery temperature rises to and above 95° F., whereupon the solenoid $S_2$ is energized so as to break the short-circuit through wires 13 and 14, whereupon the section $z$ of resistance 8 is restored to the field circuit. Since the portions $x$ and $z$ of resistance 8 are of substantially the same size, the strength of the entire field circuit will now be substantially the same as it was when the battery temperature was below 50°.

In short, an efficient charging current will be supplied to the battery while the battery temperature is between 50° F. and 95° F., but as long as the battery temperature is below 50° or above 95° the efficiency of the charging current will be considerably reduced. If the battery temperature is below the minimum or above the maximum, these facts will be shown by the signal lights 34 and 48, respectively.

The operation of the system is entirely automatic, it only being necessary to attach the battery A between the charging wires 3 and 4 and to insert the thermostat B within the battery so as to have it register the temperature thereof.

We claim:

1. A battery charging system comprising a generator comprising a field and a variable resistance in series with said field, means for connecting the battery with the generator, and means for increasing said resistance and thereby reducing the charging rate of the generator whenever the temperature within the battery is below a predetermined minimum or above a predetermined maximum.

2. A battery charging system comprising a generator comprising a field and a variable resistance in series with said field, means for connecting the battery with the generator, and means comprising an immersion thermostat for increasing said resistance and thereby reducing the charging rate of the generator whenever the temperature within the battery is below a predetermined minimum or above a predetermined maximum.

3. A battery charging system comprising a generator, means for connecting the battery with the generator, an immersion type thermostat adapted to be associated with the battery and comprising a contact adapted to be engaged at a predetermined minimum battery temperature, a second contact adapted to be engaged at a predetermined maximum battery temperature, said generator comprising a field and a resistance in series therewith for maintaining a reduced charging rate of the generator, a circuit adapted to be closed around a portion of said resistance to increase the charging rate of the generator, a relay adapted to complete said circuit when closed by said first mentioned contact, another circuit normally shunted around a second portion of said resistance, and another relay adapted to break said second shunt circuit to reduce the charging rate of the generator when the second contact is engaged.

JOHN VAN VULPEN.
EVERETT H. BURGESS.